United States Patent
Yamaura

(10) Patent No.: US 11,076,279 B2
(45) Date of Patent: Jul. 27, 2021

(54) COMMUNICATION APPARATUS AND COMMUNICATION METHOD

(71) Applicant: SONY CORPORATION, Tokyo (JP)

(72) Inventor: Tomoya Yamaura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 49 days.

(21) Appl. No.: 15/765,813

(22) PCT Filed: Jul. 19, 2017

(86) PCT No.: PCT/JP2017/026060
§ 371 (c)(1),
(2) Date: Apr. 4, 2018

(87) PCT Pub. No.: WO2018/051633
PCT Pub. Date: Mar. 22, 2018

(65) Prior Publication Data
US 2019/0349738 A1    Nov. 14, 2019

(30) Foreign Application Priority Data

Sep. 16, 2016 (JP) .............................. JP2016-182296

(51) Int. Cl.
*H04W 8/00* (2009.01)
*H04L 29/08* (2006.01)
*H04W 4/70* (2018.01)
*H04W 76/14* (2018.01)
(Continued)

(52) U.S. Cl.
CPC ......... *H04W 8/005* (2013.01); *H04L 67/1068* (2013.01); *H04W 76/14* (2018.02); *H04W 84/20* (2013.01); *H04L 67/16* (2013.01); *H04W 4/70* (2018.02); *H04W 92/18* (2013.01)

(58) Field of Classification Search
CPC ...... H04W 8/005; H04W 4/70; H04L 67/1068
See application file for complete search history.

(56) References Cited

U.S. PATENT DOCUMENTS

2015/0124792 A1*  5/2015  Gix ...................... H04W 48/16
                                                                370/338
2015/0245393 A1   8/2015  Lee et al.
2015/0296416 A1   10/2015 Lee et al.
(Continued)

FOREIGN PATENT DOCUMENTS

JP    2016-28465 A    2/2016
JP    2016-506110 A   2/2016

OTHER PUBLICATIONS

Wi-Fi Peer-to-Peer Services (P2Ps) Technical Specification (for Wi-Fi Direct® services certification) Version 1.2 (Spec).*

(Continued)

*Primary Examiner* — Zhitong Chen
(74) *Attorney, Agent, or Firm* — Xsensus LLP

(57) ABSTRACT

A communication apparatus and a communication method by which to perform communication operations in conformity with the Wi-Fi P2P specification. When either a service advertiser function or a service seeker function is to be activated, a WFD R2 device activates both the functions. In particular, the device avoids operating only as a service seeker. Accordingly, the device can discover partner devices as a service seeker, and can be discovered by the partner devices as a service advertiser.

3 Claims, 14 Drawing Sheets

(51) Int. Cl.
*H04W 84/20* (2009.01)
*H04W 92/18* (2009.01)

(56) References Cited

U.S. PATENT DOCUMENTS

| | | |
|---|---|---|
| 2016/0205199 A1 | 7/2016 | Patil et al. |
| 2017/0223761 A1 | 8/2017 | Nakagawa |
| 2018/0176856 A1* | 6/2018 | Kim .................. H04W 4/06 |

OTHER PUBLICATIONS

Extended Search Report issued in European Application 17850539.2-1214 dated Oct. 29, 2018.
Wi-Fi Alliance, "Wi-Fi Peer-to-Peer Services (P2Ps) Technical Specification (for Wi-Fi Direct Services Certification)", URL: https://www.wi-fi.org/discover-wi-fi/specifications, 84 Pages total, (Aug. 21, 2014).
International Search Report dated Sep. 19, 2017 in PCT/JP2017/026060, filed Jul. 19, 2017.

* cited by examiner

FIG. 14

|  | OPERATING ONLY AS SERVICE ADVERTISER | OPERATING BOTH AS SERVICE ADVERTISER AND SERVICE SEEKER |
|---|---|---|
| WITHOUT LIMITATION ON USABLE CHANNELS | (3-1) DEVICE WAITS FOR RECEIPT OF PROBE REQUEST INCLUDING HASH VALUE MATCHING SERVICE SUPPORTABLE BY ITSELF ON SOCIAL CHANNEL FOR PREDETERMINED PERIOD OF TIME. WHEN RECEIVING NO PROBE REQUEST, DEVICE ACTIVATES SERVICE SEEKER FUNCTION AS WELL TO SCAN ALL SUPPORTABLE CHANNELS. | (3-2) DEVICE TRANSMITS PROBE REQUEST ON SOCIAL CHANNEL AND WAITS FOR RECEIPT OF PROBE REQUEST OR PROBE RESPONSE FOR PREDETERMINED PERIOD OF TIME. WHEN DISCOVERING NO PARTNER DEVICE, DEVICE SCANS ALL SUPPORTABLE FREQUENCIES WHILE ACTIVATING BOTH SERVICE SEEKER FUNCTION AND SERVICE ADVERTISER FUNCTION. |
|  |  | (3-3) WHEN DISCOVERING PARTNER DEVICE, DEVICE SCANS ALL SUPPORTABLE FREQUENCIES WHILE ACTIVATING BOTH SERVICE SEEKER FUNCTION AND SERVICE ADVERTISER FUNCTION. |
| WITH LIMITATION ON USABLE CHANNELS | (3-4) DEVICE WAITS FOR RECEIPT OF PROBE REQUEST INCLUDING HASH VALUE MATCHING SERVICE SUPPORTED BY ITSELF ON OPERATING CHANNEL FOR PREDETERMINED PERIOD OF TIME. WHEN RECEIVING PROBE REQUEST, DEVICE ACTIVATES SERVICE SEEKER FUNCTION AS WELL TO TRANSMIT PROBE REQUEST ON OPERATING CHANNEL. | (3-5) DEVICE TRANSMITS PROBE REQUEST ON OPERATING CHANNEL AND WAITS FOR RECEIPT OF PROBE REQUEST OR PROBE RESPONSE FOR PREDETERMINED PERIOD OF TIME. |

COMMUNICATION APPARATUS AND COMMUNICATION METHOD

TECHNICAL FIELD

The technology disclosed herein relates to communication apparatuses and communication methods by which to perform communication operations in conformity with Wi-Fi peer-to-peer (P2P) specification.

BACKGROUND ART

Various types of information terminals such as smartphones, cell phones, and tablets have recently come standard with a communication function conforming to wireless local area network (LAN) standards, typified by Institute of Electrical and Electronic Engineers (IEEE) 802.11. The wireless LAN may be, for example, Wireless Fidelity (Wi-Fi), Wi-Fi P2P (hereinafter, also called "Wi-Fi Direct"), or Wi-Fi CERTIFIED Miracast (for example, refer to Patent Document 1). The information terminals with a Wi-Fi P2P function can perform printing, information sharing and synchronization, image display, and others in simple and easy operations.

CITATION LIST

Patent Document

Patent Document 1: Japanese Patent Application Laid-Open No. 2016-28465

SUMMARY OF THE INVENTION

Problems to be Solved by the Invention

An object of the technology disclosed herein is to provide an excellent communication apparatus and communication method by which to perform favorable communication operations in conformity with the Wi-Fi P2P specification.

Solutions to Problems

The technology disclosed herein is devised in view of the foregoing issue. A first aspect of the technology is a communication apparatus that supports services using Wi-Fi P2P or basic service set (BSS) connection. When either a service advertiser function or a service seeker function is to be activated, the communication apparatus activates both the service advertiser function and the service seeker function.

According to a second aspect of the technology disclosed herein, the communication apparatus according to the first aspect is configured to activate the service seeker function with receipt of a seek service method by an application service platform (ASP) from a service layer in the communication apparatus as a trigger, and activate the service advertiser function as well when the service advertiser function is deactivated.

In addition, a third aspect of the technology disclosed herein is a communication apparatus that supports services using Wi-Fi P2P or BSS connection. When activating only a service advertiser function, the communication apparatus starts to activate a service seeker function with receipt of a request or a query specifying a supportable service as a trigger.

According to a fourth aspect of the technology disclosed herein, the communication apparatus according to the third aspect is configured to, when activating only the service advertiser function, activate the service seeker function to transmit a request or a query specifying a supportable service to another communication apparatus with receipt of a request including a hash value matching a name of a supportable service or a query including a character string indicating a name of a supportable service as a trigger.

In addition, a fifth aspect of the technology disclosed herein is a communication apparatus that supports services using Wi-Fi P2P or BSS connection. When activating only a service advertiser function in a situation without a limitation on usable channels, the communication apparatus starts to activate a service seeker function to transmit a request or a query specifying a supportable service on all supportable channels with no receipt of a request or a query specifying a supportable service on a social channel within a predetermined period of time as a trigger.

According to a sixth aspect of the technology disclosed herein, the communication apparatus according to the fifth aspect is configured to deactivate the service seeker function with no receipt of a response to the request or the query transmitted by using the service seeker function within a second predetermined period of time as a trigger.

In addition, a seventh aspect of the technology disclosed herein is a communication apparatus that supports services using Wi-Fi P2P or BSS connection. When activating both a service seeker function and a service advertiser function in a situation without a limitation on usable channels, the communication apparatus transmits a request or a query specifying a supportable service on all supportable channels with no receipt of a response to a request or a query specifying a supportable service transmitted by itself on a social channel within a predetermined period of time or with no receipt of a request or a query specifying a supportable service on the social channel within a predetermined period of time as a trigger.

In addition, an eighth aspect of the technology disclosed herein is a communication apparatus that supports services using Wi-Fi P2P or BSS connection. When activating both a service seeker function and a service advertiser function in a situation without a limitation on usable channels, the communication apparatus transmits by itself a request or a query specifying a supportable service and waits for receipt of a response to the request or the query transmitted by itself or a request or a query specifying a supportable service on a social channel, and then transmits a request or a query specifying a supportable service on all supportable channels.

According to a ninth aspect of the technology disclosed herein, the communication apparatus according to the eighth aspect is configured to, after asking a user to confirm transmission of a request or a query on channels other than the social channel or after a lapse of a predetermined period of time, transmit a request or a query on all the supportable channels.

In addition, a tenth aspect of the technology disclosed herein is a communication apparatus that supports services using Wi-Fi P2P or BSS connection. When activating only a service advertiser function in a situation where a usable channel is limited to an operating channel, the communication apparatus starts to activate a service seeker function to transmit a request or a query specifying a supportable service on the operating channel with receipt of a request or a query specifying a supportable service on the operation channel as a trigger.

In addition, an eleventh aspect of the technology disclosed herein is a communication apparatus that supports services using Wi-Fi P2P. When activating both a service seeker function and a service advertiser function in a situation where a usable channel is limited to an operating channel, the communication apparatus transmits a probe request frame and waits for receipt of a probe request frame from another device or receipt of a probe response frame to the probe request frame transmitted by the device itself on the operating channel.

In addition, a twelfth aspect of the technology disclosed herein is a communication method of a communication apparatus supporting services using Wi-Fi P2P or BSS connection. The communication method includes the steps of starting to activate a service seeker function and starting to activate a service advertiser function when the service advertiser function is deactivated.

In addition, a thirteenth aspect of the technology disclosed herein is a communication method of a communication apparatus supporting services using Wi-Fi P2P or BSS connection. The communication method includes the steps of activating a service advertiser function to wait for receipt of a request or a query specifying a supportable service from another communication apparatus and starting to activate a service seeker function to transmit a request or a query specifying a supportable service with receipt of a request or a query specifying a supportable service as a trigger.

In addition, a fourteenth aspect of the technology disclosed herein is a communication method of a communication apparatus supporting services using Wi-Fi P2P or BSS connection in a situation without a limitation on usable channels. The communication method includes the steps of activating a service advertiser function to wait for receipt of a request or a query specifying a supportable service from another device on a social channel, starting to activate a service seeker function with no receipt of a request or a query specifying a supportable service within a predetermined period of time as a trigger, and transmitting a request or a query specifying a supportable service on all supportable channels.

In addition, a fifteenth aspect of the technology disclosed herein is a communication method of a communication apparatus supporting services using Wi-Fi P2P or BSS connection in a situation without a limitation on usable channels. The communication method includes the steps of activating both a service seeker function and a service advertiser function, waiting for receipt of a response to a request or a query specifying a supportable service transmitted by itself on a social channel, and transmitting a request or a query specifying a supportable service on all supportable channels with no receipt of a response to the request or the query transmitted by itself within a predetermined period of time or with no receipt of a request or a query specifying a supportable service within a predetermined period of time as a trigger.

In addition, a sixteenth aspect of the technology disclosed herein is a communication method of a communication apparatus supporting services using Wi-Fi P2P or BSS connection in a situation without a limitation on usable channels. The communication method includes the steps of activating both a service seeker function and a service advertiser function, transmitting a request or a query specifying a supportable service on a social channel, waiting for receipt of a response to the request or the query transmitted by itself or receipt of a request or a query specifying a supportable service, and transmitting a request or a query specifying a supportable service on all supportable channels.

In addition, a seventeenth aspect of the technology disclosed herein is a communication method of a communication apparatus supporting services using Wi-Fi P2P or BSS connection in a situation where a usable channel is limited to an operating channel. The communication method includes the steps of activating a service advertiser function to wait for receipt of a request or a query specifying a supportable service from another device on the operating channel, starting to activate a service seeker function with receipt of a request or a query specifying a supportable service on the operating channel as a trigger, and transmitting a request or a query specifying a supportable service on the operating channel.

In addition, an eighteenth aspect of the technology disclosed herein is a communication method of a communication apparatus supporting services using Wi-Fi P2P in a situation where a usable channel is limited to an operating channel. The communication method includes the steps of activating both a service seeker function and a service advertiser function, transmitting a probe request frame on the operating channel, and waiting for receipt of a probe request frame from another device or receipt of a probe response frame to the probe request frame transmitted by the device itself on the operating channel.

Effects of the Invention

According to the technology disclosed herein, it is possible to provide an excellent communication apparatus and communication method by which to perform favorable communication operations in device discovery and service discovery, as a service seeker and a service advertiser defined in Wi-Fi P2P service.

For reference, the advantageous effect described herein is a mere example, and the advantageous effect of the present invention is not limited to this. In addition, the present invention may produce additional advantageous effects besides the foregoing advantageous effect.

Other objects, features, and advantages of the technology disclosed herein will be clarified by the following detailed descriptions of the embodiments and the accompanying drawings.

BRIEF DESCRIPTION OF DRAWINGS

FIG. 14 is a diagram describing main features of point (3).

MODE FOR CARRYING OUT THE INVENTION

An embodiment of the technology disclosed herein will be described below in detail with reference to the drawings.

According to Wi-Fi P2P, devices can be easily connected to each other without intervention of access points (AP). In addition, in Wi-Fi Alliance (WFA), techniques for introducing a platform supporting various services using Wi-Fi P2P link (for example, Send, Play, Display, Print, and the like), that is, Wi-Fi P2P services (P2Ps) are specified.

Figure 1:
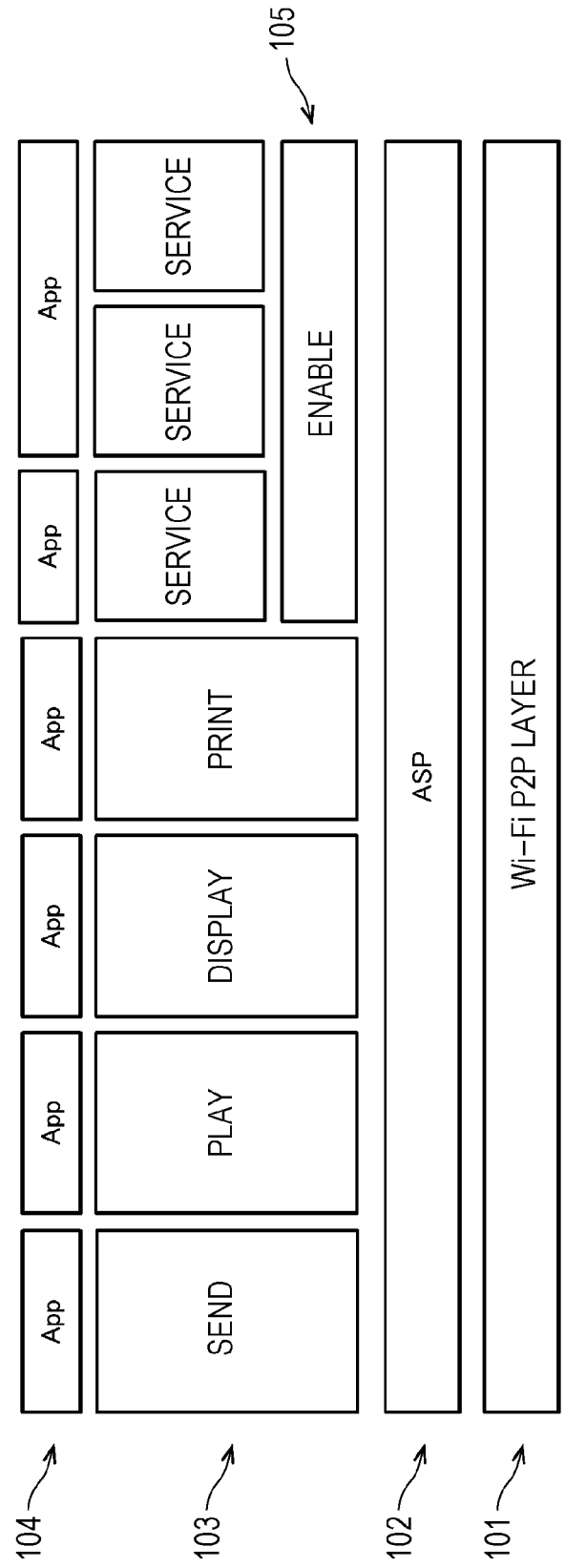
FIG. 1 is a diagram illustrating P2Ps framework components.

FIG. 1 is a diagram illustrating P2Ps framework components. Referring to FIG. 1, a Wi-Fi P2P layer with reference number 101 is equivalent to a media access control (MAC) layer defined by Wi-Fi P2P standards and can be configured as software compatible with the Wi-Fi P2P standards.

In addition, in a level higher than the Wi-Fi P2P layer 101, an application service platform (ASP) with reference number 102 is defined. For reference, although not illustrated, in a level lower than the Wi-Fi P2P layer 101, wireless connection is formed by a physical layer compatible with Wi-Fi PHY. Further, in a level higher than the ASP layer 102, a service layer with reference number 103 is defined.

The ASP layer 102 is a common platform shared among the services, which manages sessions between a highest-level application (App) layer 104 and the lower-level Wi-Fi P2P layer 101, processes service orders, performs controls with the ASPS of other devices, and the like. The ASP layer 102 implements common functions required in the services, specifically, device discovery, service discovery, ASP session management, and the like.

The service layer 103 includes use case-specific services. WFA defines basic services such as send, play, display, and print. Here, the send service is a service and application for file transmission between two P2Ps devices. In addition, the play service is a service and application for contents sharing or streaming between two P2Ps devices based on Digital Living Network Alliance (DLNA) (registered trademark). Additionally, the display service is a service and application that allows screen sharing between devices (source and sink). More specifically, the display service is a use case of Miracast as a WFA-formulated display transmission technique through one-on-one wireless communications, and its technical specification is prescribed as Wi-Fi Display (WFD). In addition, the print service is a service and application that allows printout of documents and images between a device having contents such as documents and images and a printer.

Further, to support applications provided by third parties and make the ASP-common platform usable, an enable application program interface (API) with reference number 105 may be defined.

The application layer 104 can provide a user interface (UI) and has the function of representing visually information to the user and transferring input information from the user to lower-level layers.

Figure 2:
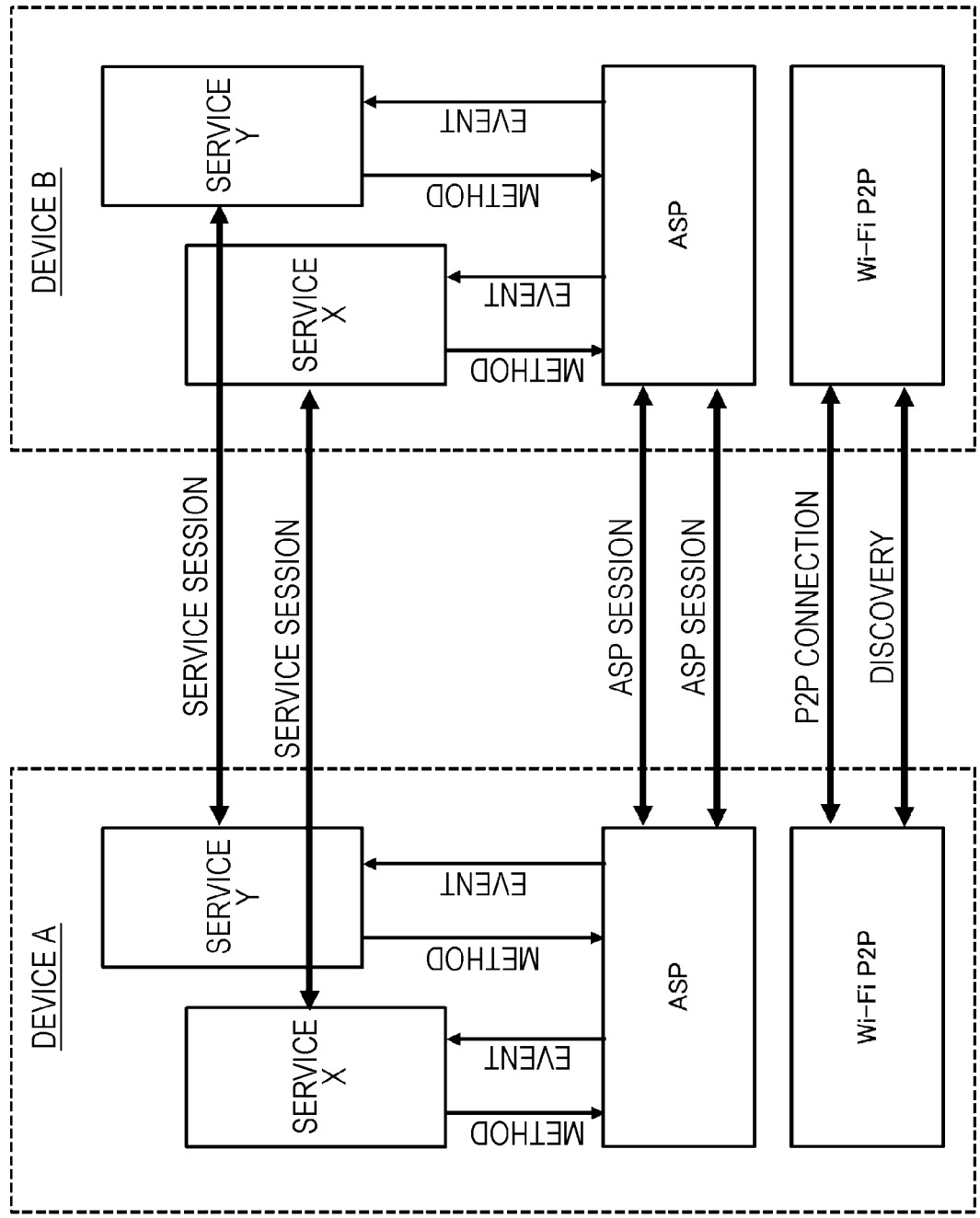
FIG. 2 is a diagram for describing P2Ps operations.

Subsequently, P2Ps operations will be described with reference to FIG. 2. Referring to FIG. 2, there exist two devices A and B that are P2P-connected by P2Ps.

When device discovery and P2P are carried out between the P2P layers of the device A and the device B, a logical link called ASP session is set up between the ASPs. For reference, the ASP can set up a plurality of ASP sessions with the ASP in a partner device for each service. Each of the ASP sessions is identified by a session identifier assigned by the ASP having requested the session.

A service of a device can communicate with the corresponding service of the other device by using a service-specific protocol defined by the service-standard ASP protocol. In the example illustrated in FIG. 2, a service session is set up in a service X between the device A and the device B, and another service session is set up in a service Y between the device A and the device B.

Interfaces called method and event are defined between the ASP and the service in the device. The method is an interface indicating an operation started by the service. The parameter (or field) of the method can include information regarding the operation to be performed. In addition, the event is an interface that is provided by the ASP to the service.

For example, in a case where the user utilizes the service X between the device A and the device B, the ASPs of the devices establish an ASP session dedicated to the service X between the devices, and then establish a service session between the devices. Further, in a case where the user utilizes the service Y, the ASPs of the devices newly establish an ASP session dedicated to the service Y between the devices, and then establish a service session between the devices.

Figure 3:
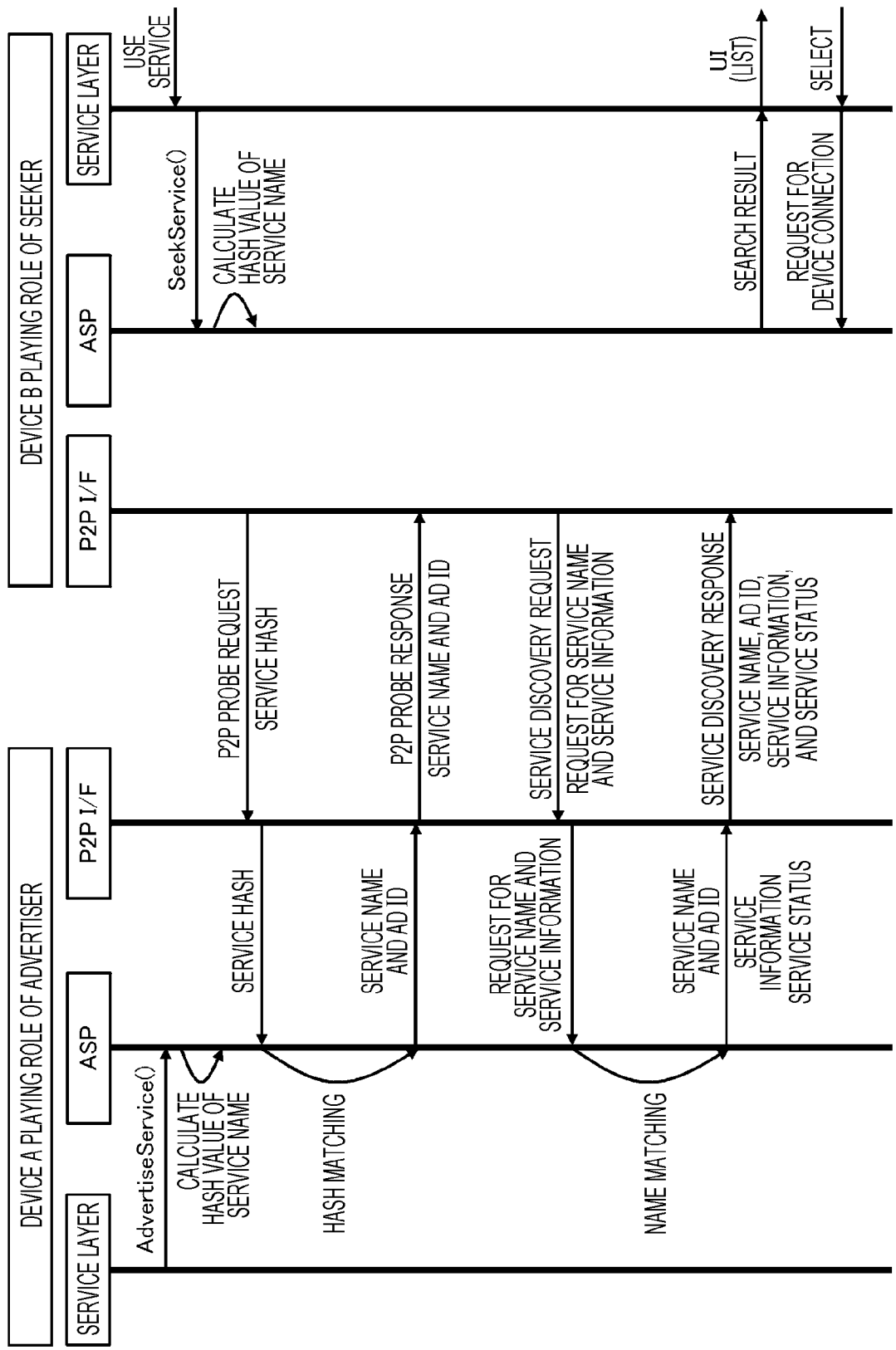
FIG. 3 is a diagram illustrating a sequence of operations for setting up an ASP session between P2Ps devices.

Subsequently, a sequence of operations for setting up an ASP session between P2Ps devices will be described with reference to FIG. 3.

In WFA-prescribed P2Ps, the roles of service seeker and service advertiser are defined in device discovery. The service seeker can discover the service advertiser. Upon detection of a desired service, the service seeker can also request for connection to the service advertiser. FIG. 3 illustrates an example in which an ASP session is set up between the device A playing the role of service advertiser and the device B playing the role of service seeker. For reference, the terms service seeker and service advertiser are frequently used to mean the entire devices playing those roles, but more strictly, the terms refer to P2Ps devices (P2Ps devices) that activate a service seeker function (service seeker application) and a service advertiser function (service advertiser application).

In the process of ASP setup operations, a specific service of one P2Ps device searches for the other P2Ps device and service, requests for the service, establishes a Wi-Fi P2P connection, and activates the application.

When the ASP in the device A receives an advertise service method from the service layer of the device A, the device A operates as service advertiser. Referring to FIG. 3, the device A activates the service advertiser on the P2P interface (I/F) side. The device A advertises its service and waits for the other device so as to search for the service. In addition, the ASP in the device A can response to the other device on the basis of the information included in the advertise service method supplied from the service layer.

In addition, upon receipt of information indicating the intention of using a service (user service) from an application (not illustrated), the service layer of the device B can store information necessary for a seek service method and transfer the same to the ASP. Then, when the ASP in the device B receives the seek service method from the service layer, the device B operates as service seeker to perform a process of searching for a device supporting the service requested by the higher-level application or the user. Referring to FIG. 3, the device B activates service seeker on the P2P interface side.

The ASP in the device B transmits a probe request frame from the P2P interface side to the other device. At that time, the ASP in the device B calculates a hash value of the name of the service searched for by itself, and includes the same in the probe request frame.

The ASP in the device A calculates in advance hash values of the names of services supported by itself. Upon receipt of the probe request from the device B by the P2P interface, the device A attempts hash matching. Then, when determining that there is a match between the hash values and the device A supports the service searched for by the device B, the device A transmits a probe response frame to the device B from the P2P interface side. The probe response frame may include the service name, the advertisement ID, and the like.

In the process of exchanging the probe request frame and the probe response frame, the device A and the device B can determine that they are P2Ps-supporting devices and detect their respective supporting services. This process can be said to a device discovery process.

Subsequently, the device A and the device B exchange information regarding specific items of the service in the P2P service discovery process.

For example, the device B transmits the service name (a plurality of service names in a case of searching for the presence or absence of supporting of a plurality of services) and a service discovery request message including a service information request message from the P2P interface of the device B to the device A.

In response to this, the ASP in the device A performs service name matching. In a case where there is a match, the device A transmits a service discovery response message from the P2P interface of the device A to the device B. The service discovery response message may include information such as service name, advertisement ID, and service status. The service status is information for notifying whether the service requested by a remote device is available on the side of the device A as a service advertiser.

Upon completion of the operation requested by the seek service method from the service layer, the ASP in the device B can notify the search result as result of the operation to the application and the user through the service. For example, the application (not illustrated) displays a UI of a list of devices discovered in the P2P service discovery process. The user can select a desired device through the UI. The ASP attempts P2P connection to the user-selected device with receipt of a connection request (connect session) method from the service layer as a trigger. The detailed descriptions of the subsequent processes will be omitted.

Figure 4:
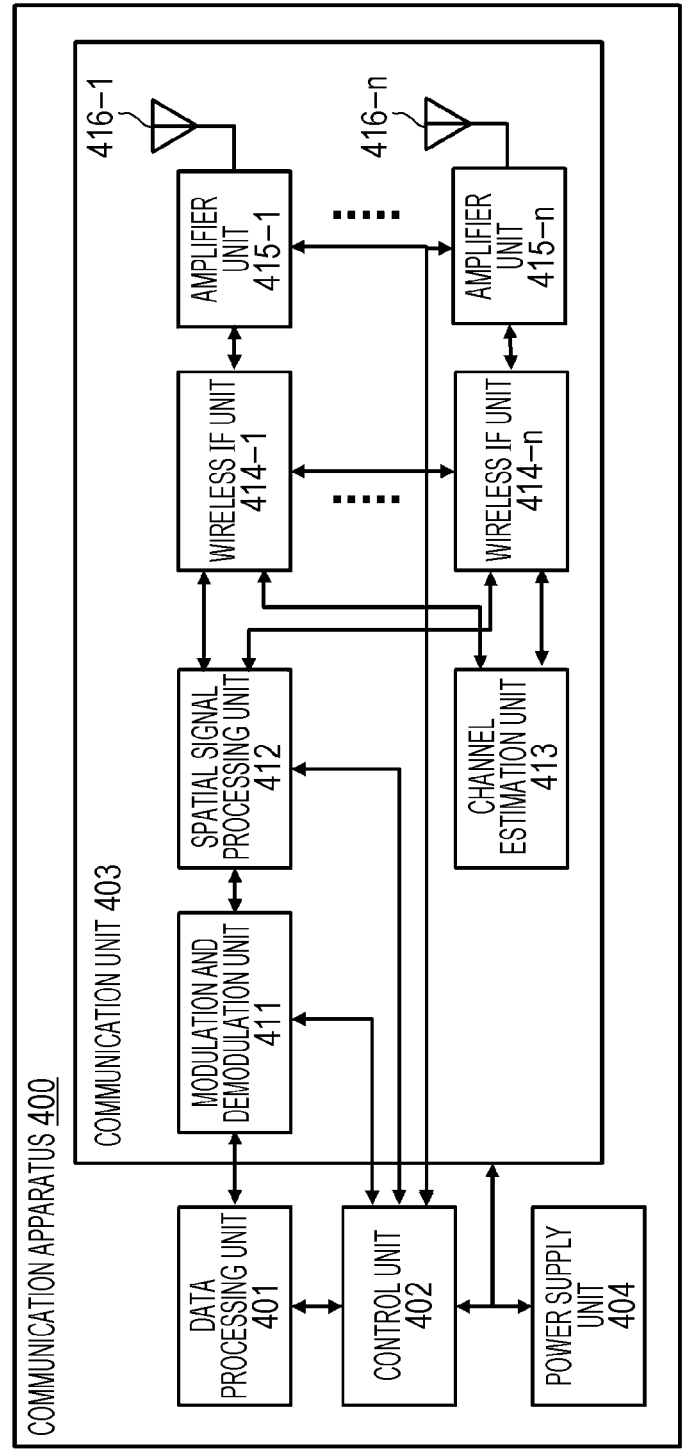
FIG. 4 is a diagram illustrating a functional configuration example of a communication apparatus 400 performing wireless communication operations as a P2Ps device.

FIG. 4 is a diagram illustrating a functional configuration example of a communication apparatus 400 performing wireless communication operations as a P2Ps device.

The communication apparatus 400 includes a data processing unit 401, a control unit 402, a communication unit 403, and a power supply unit 404. In addition, the communication unit 403 further includes a modulation and demodulation unit 411, a spatial signal processing unit 412, a channel estimation unit 413, a wireless interface (IF) unit 414, an amplifier unit 415, and an antenna 416. A set of the wireless interface unit 414, the amplifier unit 415, and the antenna 416 may form one transmission and reception branch, and a plurality of (n) transmission and reception branches may be provided as illustrated in FIG. 4. For reference, the function of the amplifier unit 415 may be included in the wireless interface unit 414.

The communication unit 403 is assumed to perform wireless communication operations by using some of a plurality of P2Ps-prescribed frequency channels. The channel currently performing communication operations is called operating channel. In addition, the channel used for device discovery and service discovery is called social channel. For the communication apparatus 400, there is a case without a limitation on channels usable by the communication unit 403 (it is possible to shift to the social channel other than the operating channel in a time-division manner) and there is a case with a limitation on channels usable by the communication unit 403 (it is not possible to shift to the social channel).

At a transmission time when data is input from a higher-level layer (not illustrated) in the communication protocol, the data processing unit 401 generates packets for wireless communications from the data, performs processes such as addition of a MAC header for media access control and an error detection code, and provides the processed data to the modulation and demodulation unit 411. In addition, at a reception time when data is input in reverse from the modulation and demodulation unit 411, the data processing unit 401 performs MAC header analysis, packet error detection, packet reordering, and the like, and provides the processed data to its protocol higher-level layer. In the P2Ps framework, the MAC layer defined by the Wi-Fi P2P standards is equivalent to the Wi-Fi P2P layer (see FIG. 1).

The control unit 402 allows information exchange among the components of the communication apparatus 400. In addition, the control unit 402 sets parameters in the modulation and demodulation unit 411 and the spatial signal processing unit 412 of the communication unit 403, and performs packet scheduling in the data processing unit 401. Further, the control unit 402 sets parameters and controls transmission power of the wireless interface unit 414 and the amplifier unit 415 in the communication unit 403. In particular, according to the technology disclosed herein, the control unit 402 controls the operations of the service seeker and the service advertiser in device discovery and service discovery.

At a transmission time, the modulation and demodulation unit 411 performs encoding, interleaving, and modulation processing on the data input from the data processing unit 401, according to the coding and modulation schemes set by the control unit 402 to generate data symbol streams, and provides the same to the spatial signal processing unit 412.

In addition, at a reception time, the modulation and demodulation unit 411 performs demodulation processing, de-interleaving, and decoding on the data input from the spatial signal processing unit 412 in the reverse of the transmission time, and provides the processed data to the data processing unit 401 or the control unit 402.

At a transmission time, the spatial signal processing unit 412 performs signal processing as necessary on the data input from the modulation and demodulation unit 411 for spatial separation, and provides one or more obtained transmission symbol streams to each of the wireless interface units 413. In addition, at a reception time, the spatial signal processing unit 412 performs signal processing on the reception symbol stream input from each of the wireless interface units 414, subjects the stream to spatial separation as necessary, and provides the stream to the modulation and demodulation unit 411.

The channel estimation unit 413 calculates propagation path complex channel gain information from a preamble portion and a training signal portion of the input signal from each of the wireless interface units 414. The calculated complex channel gain information is used via the control unit 402 in the modulation and demodulation processing at the modulation and demodulation unit 411 and the spatial processing at the spatial signal processing unit 412.

At a transmission time, the wireless interface unit 414 converts the input from the spatial signal processing unit 412 into an analog signal, performs filtering and up-converting into a carrier frequency, and sends the same to the antenna 416 or the amplifier unit 415. In addition, at a reception time, the wireless interface unit 414 subjects the input from the antenna 416 or the amplifier unit 415 to down-converting into a baseband frequency and converting into a digital signal in reverse, and provides the processed data to the spatial signal processing unit 412 and the channel estimation unit 413.

At a transmission time, the amplifier unit 415 amplifies the analog signal input from the wireless interface unit 414 to predetermined power, and sends the same to the antenna 416. In addition, at a reception time, the amplifier unit 415 performs low-noise amplification of the signal input from the antenna 416 to predetermined power, and outputs the same to the wireless interface unit 414. At least either the transmission-time function or the reception-time function of the amplifier unit 415 may be included in the wireless interface unit 414.

The power supply unit 404 includes a battery power source or a stationary power source (commercial power source or the like) that supplies power to the components of the communication apparatus 400.

Subsequently, problems with conventional P2Ps device discovery will be described.

In WFA-prescribed P2Ps, the roles of service seeker and service advertiser are defined in device discovery and service discovery (as described above). The service seeker can display a UI of a list of discovered partner devices, and attempts connection to the device selected by the user through the UI of the service seeker. However, the service advertiser only returns information regarding services supported by itself but cannot generate a device list screen, and thus the user cannot select the device via the UI of the service advertiser.

The foregoing prescription is applicable without problem to a service that is favorably functional with a combination of one device serving as a seeker and the other as an advertiser. For example, in a print service, a personal computer (PC) as a print server is a seeker and a printer is an advertiser. The print server as a seeker attempts to discover printers and connect to the printer selected by the user. In addition, the printer as an advertiser only needs to return information regarding the print service supported by itself to the print server and does not need to present a device list to the user or attempt connection to the selected print server.

However, in a case of a display service and the like that allows screen sharing between devices, it is necessary to make a mechanism in which the partners can be selected by each other from both the source transmitting screen information and the sink receiving the screen information from the source and displaying the same. For example, in a case of outputting images from a smartphone and displaying the same on a large screen such as a television, it is preferred that the device as destination of image output can be selected from the smartphone and the smartphone as image source can be selected in reverse from the television. Specifically, in a use case of Wi-Fi Display Release 2 (hereinafter, referred to as WFD R2) as a WFA-developed display transmission technology through one-on-one wireless communications, both the devices of source and sink need to support both seeker and advertiser. If the procedure and operating method for supporting both the functions are not properly determined, compatibility problems may occur.

In short, the WFD R2 devices need to be capable of activating both a service seeker and a service advertiser simultaneously. However, the devices here refer to both source and sink.

The service seeker and the service advertiser are defined in the P2Ps technical specification "Wi-Fi Peer-to-Peer Service Technical Specification". In addition, the technical specification is publicly available free of charge. However, the P2Ps technical specification only states that, when the ASP receives a seek service method, the device starts to operate as a service seeker, and when the ASP receives an advertise service method, the device starts to operate as a service advertiser. That is, as of the filing of the subject application, the procedure and operating method for the devices to support both service seeker and service advertiser in device discovery are not clearly defined.

Meanwhile, when a device simply activates both service seeker and service advertiser, the device operates as a service seeker to continuously transmit a probe request until discovering a partner device, which increases power consumption and load on the wireless communication media. To avoid this problem, for example, if a device simply switches between the time for activating the service seeker function and the time for activating the service advertiser function, the device is less likely to be discovered by other P2Ps devices supporting the service or is less likely to discover other P2Ps devices supporting the service. This is contradictory to the original purpose for activating both service seeker and service advertiser for mutual discovery. Further, if the service seeker function is always activated, at each discovery of a partner device, a list of discovered partner devices and a UI for asking the user to confirm connection are displayed, which may be annoyance to the user.

In addition, the P2Ps specification prescribes only Wi-Fi P2P as a means for connection of the second layer. With this prescription, even if a terminal connected to an AP attempts to offer a service through the AP, the service cannot be implemented due to incapability of device discovery and service discovery. Accordingly, some function extension is desired to implement device discovery and service discovery using BSS connection to the AP.

Therefore, there are proposed herein a procedure and operating method for a WFD R2 device to support both seeker and adviser in device discovery with an extension to the P2Ps technical specification.

For reference, to implement the procedure and the operating method described later, the communication apparatus 400 illustrated in FIG. 4 can activate service seeker and service advertiser simultaneously in the control unit 402, and controls the starting of the service seeker operation.

It is first assumed that a WFD R2 device activates the service advertiser function by default. As a modification example, when the ASP receives an advertise service method as usual, the device starts to activate the service advertiser function.

Based on the foregoing assumption, the following points (1) to (3) regarding the procedure or operating method for a WFD R2 device will be described.

Point (1)

When the ASP in the WFD R2 device receives at least either a seek service method or an advertise service method, the device activates the service seeker function. In addition, when the service advertiser is off at that time, the device activates the service advertiser function as well.

In short, when either the service advertiser function or the service seeker function is to be activated, the WFD R2 device activates both the functions. In particular, the device avoids operating only as a service seeker. Accordingly, the device can discover partner devices as a service seeker, and also can be discovered by the partner devices as a service advertiser.

Figure 5:
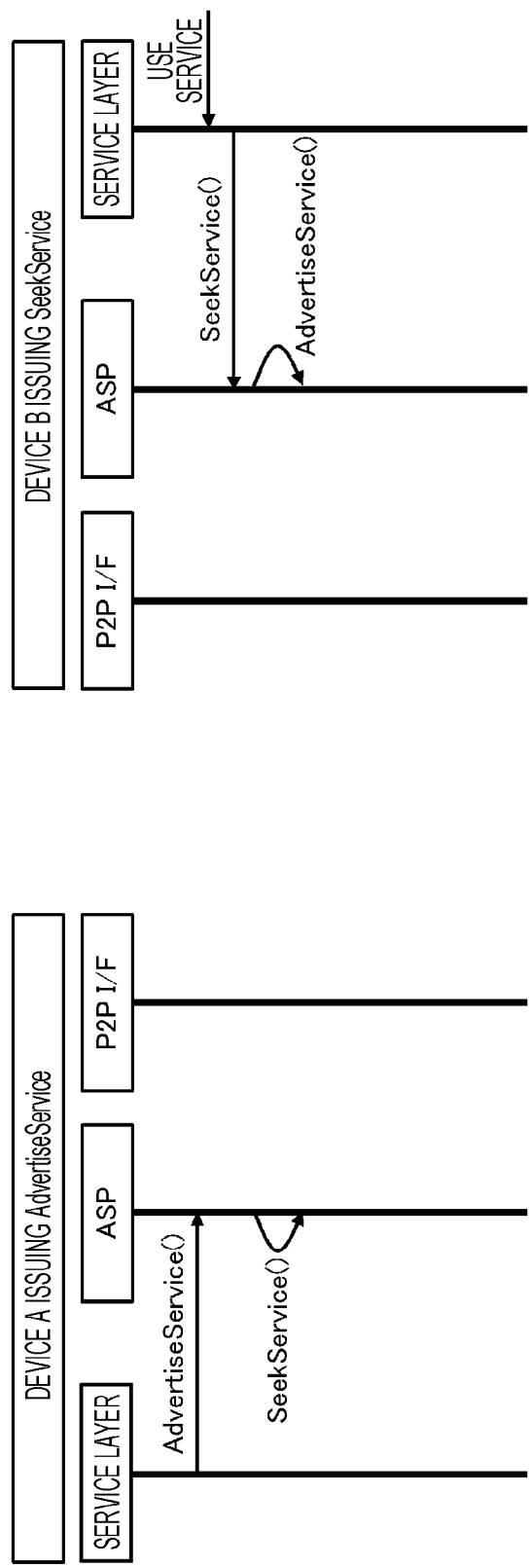
FIG. 5 is a diagram illustrating a sequence example of setting up a WFD R2 device to activate both a service advertiser function and a service seeker function.

FIG. 5 illustrates a sequence example of operations for setting up a WFD R2 device to activate both the service advertiser function and the service seeker function.

The device B operates as a service seeker with receipt of a seek service method from the service layer by the ASP in the device B as a trigger. The device B transmits a probe request frame to other devices to perform a device discovery process, and the like as described above with reference to FIG. 3, which is not illustrated in the drawing or described here in detail. At that time, if the service advertiser is off in the device B, the ASP issues an advertise service method to itself to allow the device B to operate as a service advertiser as well.

In addition, the device B operates as a service advertiser with receipt of an advertise service method from the service layer by the ASP in the device A as a trigger. The device A waits for receipt of a probe request from another device, and the like as described above with reference to FIG. 3, which is not illustrated in the drawing or described here in detail. If the service seeker is off in the device A at that time, the ASP in the device A issues a seek service method to itself to allow the service A to serve as a service seeker as well.

Figure 6:
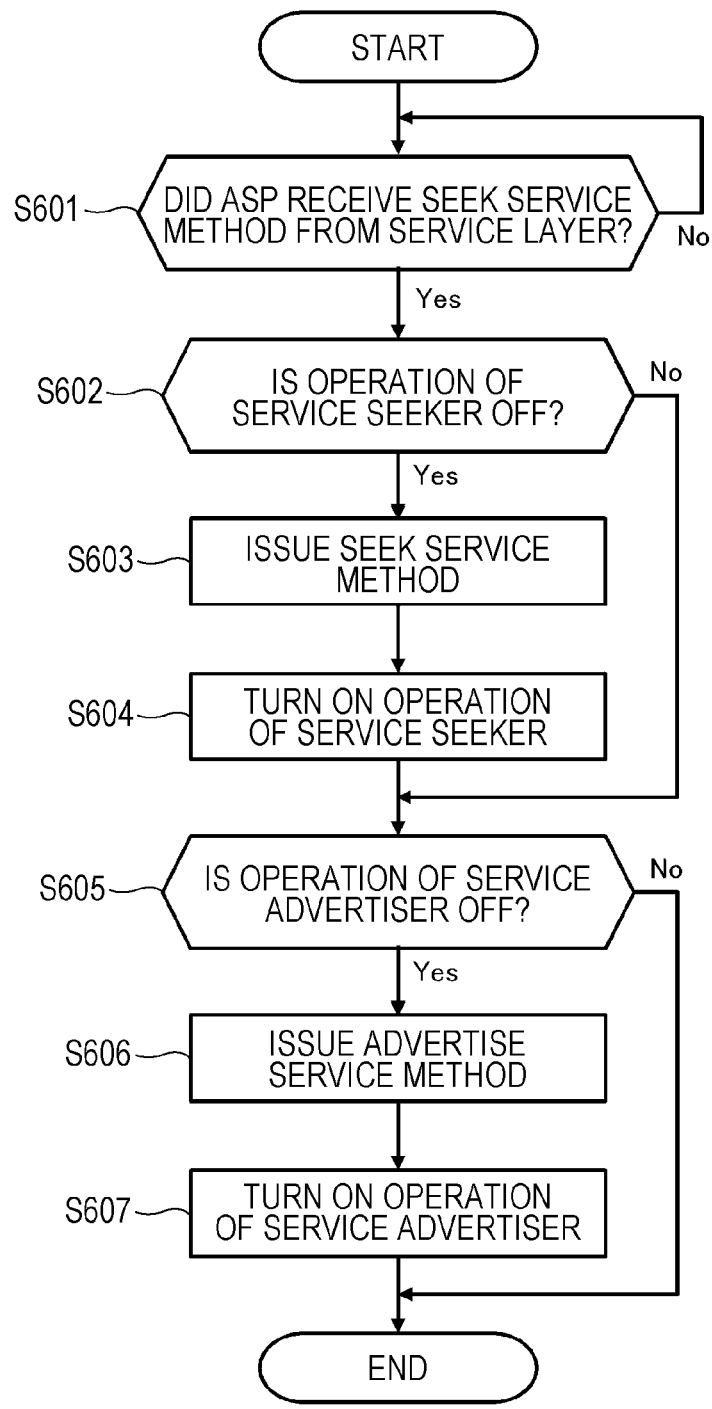
FIG. 6 is a flowchart of a procedure of operations for setting up a WFD R2 device to activate both the functions of service advertiser and service seeker.

FIG. 6 illustrates in flowchart form, a procedure of operations for setting up a WFD R2 device to activate both the functions of service advertiser and service seeker.

When the ASP receives a seek service method from the service layer in the device (step S601: Yes), the ASP checks if the operation of the service seeker is off in the device (step S602). Then, when the operation of the service seeker is off (step S602: Yes), the ASP issues a seek service method to itself in the device (step S603), and the device turns on the operation of the service seeker (step S604). In this manner, the device operates as a service seeker.

At that time, the ASP checks if the operation of the service advertiser is off in the device (step S605). Then, when the operation of the service advertiser is off (step S605: Yes), the ASP issues an advertise service method to itself in the device (step S606), and the device turns on the operation of the service advertiser (step S607).

Point (2)

When activating only the service advertiser function on the P2P interface side, the WFD R2 device activates the service seeker function as well immediately upon receipt of a probe request frame including a hash value matching a service supported by itself (for example, Miracast Sink). As a result, the device can transmit by itself a probe request frame to other devices.

Without starting the service seeker, the WFD R2 device cannot search for a partner device by itself or create a device list to be displayed on the device itself. Accordingly, the device activating only the service advertiser function can activate the service seeker function as well as described above to create a device list to be displayed on the device itself and provide the UI to the user.

Figure 7:
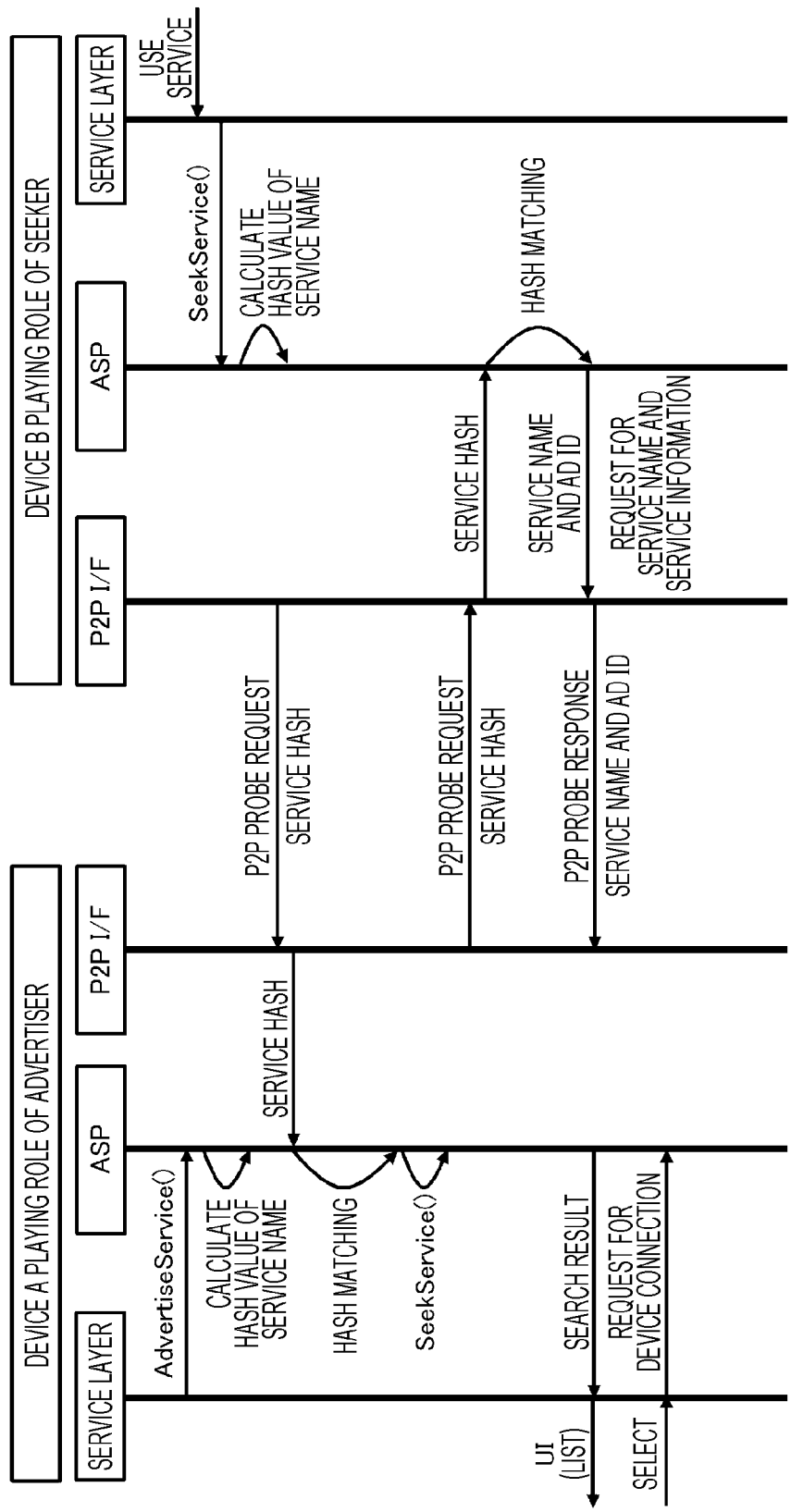
FIG. 7 is a diagram illustrating a sequence example of operations for setting up a WFD R2 device activating only the service advertiser function on a P2P interface side to activate the service seeker function as well.

FIG. 7 illustrates a sequence example of operations for setting up the WFD R2 device A activating only the service advertiser function on the P2P interface side to activate the service seeker function as well.

The device B starts to activate the service seeker function with receipt of a seek service method from the service layer by the ASP in the device B as a trigger. Then, the device B transmits a probe request frame including a hash value of the name of the service searched for by itself to other devices.

The device A activates only the service advertiser function upon receipt of an advertise service method from the service layer by the ASP in the device A. Here, it is assumed that the hash value of the service name included in the probe request frame received from the device B matches a service supported by the device A. The device A returns a probe response frame to the device B, continues to perform the service discovery process with the device B, and the like as described above with reference to FIG. 3, which is not illustrated in the drawing or described here in detail. At that time, the ASP in the device A issues a seek service method to itself to allow the device A to activate the service seeker function as well.

Then, the device A can transmit a probe request frame including a hash value of the name of the service searched for by itself to other devices, receive a probe response frame from a device with a matching hash value (assuming as the device B), and provide a UI of a device list based on the search result to the user.

Figure 8:
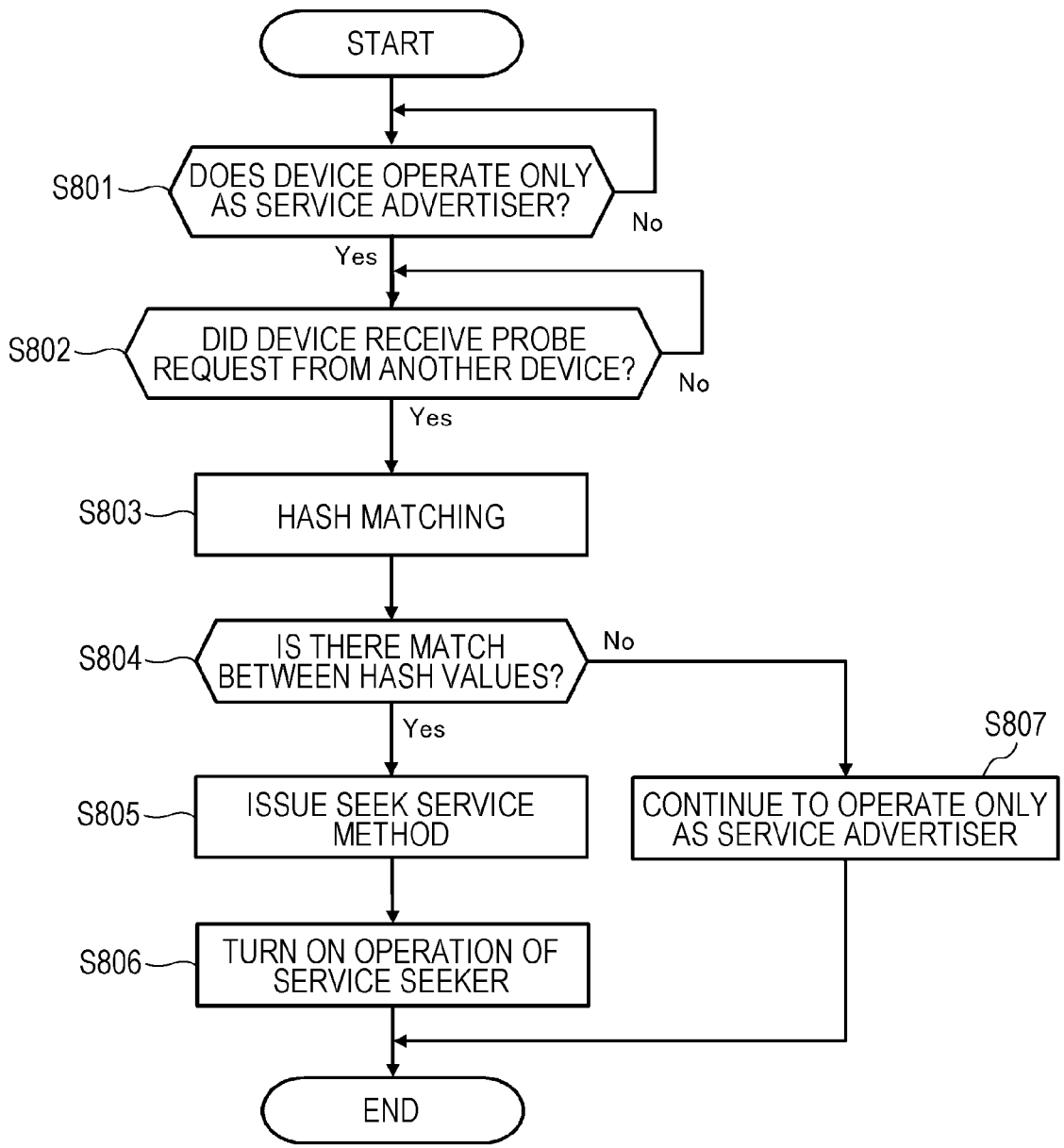
FIG. 8 is a flowchart of a procedure of operations for setting up a WFD R2 device activating only the service advertiser function on the P2P interface side to activate the service seeker function as well.

FIG. 8 illustrates in flowchart form, a procedure of operations for setting up a WFD R2 device activating only the service advertiser function on the P2P interface side to activate the service seeker function as well.

When operating as a service advertiser (step S801: Yes), the device waits for receipt of a probe request frame from another device (operating as a service seeker) (step S802).

Then, upon receipt of a probe request frame from another device (step S802: Yes), the device performs hash matching to determine whether a hash value of the service name included in the received probe request frame matches a service supported by the device itself (step S803).

Here, when there is no match between the hash values (step S804: No), the device can determine that the received probe request frame specifies a service not supported by the device itself. In this case, the device returns to step S801 and continues to operate only as a service advertiser.

Meanwhile, when there is a match with the hash value of the service name (step S804: Yes), the device can determine that the received probe request frame specifies a service supportable by the device itself. In this case, the ASP in the device issues a seek service method to itself (step S805) to allow the device to activate the service seeker function as well (step S806).

In this manner, the device activating only the service advertiser function activates the service seeker function as well with receipt of a probe request frame with a matching hash value as a trigger. Accordingly, the device can transmit a probe request frame by itself, receive a probe response frame to the probe request frame, generate a device list to be displayed on the device itself, and provide the UI to the user.

There may be a modification example in which similar operations are performed on the basic service set (BSS) connection side. That is, when activating only the service advertiser function on the BSS interface side, the WFD R2 device activates the service seeker function as well immediately upon receipt of a multicast domain name system (DNS) query (mDNS query) including a character string corresponding to a service supported by itself (for example, Miracast Sink). As a result, the device can transmit an mDNS query by itself, receive an mDNS response from another device having received the mDNS query including the corresponding character string, and generate a device list to be displayed on the device itself, on the basis of the search results of device discovery and service discovery.

Point (3)

The WFD R2 device controls operations depending on the presence or absence of limitation on usable channels and the operational state of the service advertiser or the service seeker of the device.

Under IEEE802.11, the assigned bandwidth is divided into a plurality of channels. One of the channels is assigned as the social channel for use in service discovery, and the other channels are used in general communication operations. As described above, among these channels, in particular, the channel for use in the connection to the AP on the BSS interface side, the channel operating as a P2P client for use in the connection to a P2P group owner (P2P GO), or the channel operating as P2P GO by itself will be called operating channel.

The case where there is no limitation on usable channels specifically means the case where the device is not associated with the AP or the P2P GO, is not operating as P2P GO, or is associated with an access point operating outside the social channel or is a member of the P2P group but can shift to the social channel other than the operating channel in a time-division manner.

Meanwhile, the case where there is a limitation on usable channels specifically means the case where the device is associated with the AP or the P2P GO or the device is operating as P2P GO by itself, and the operating channel is not the social channel and cannot shift to the social channel in a time-division manner to transmit or receive data. In this case, the frame transmitting and receiving operations are limited to the operating channel.

(3-1) The WFD R2 device operating only the service advertiser function for the P2P interface in a case without a limitation on usable channels waits only for a predetermined period of time for receipt of a probe request frame including a hash value matching a service supported by itself on the social channel. When receiving no probe request frame, the WFD R2 device activates the service seeker function as well to perform scanning (that is, transmitting a probe request frame, waiting for reception of a probe response frame, and waiting for receipt of a probe request frame) on all the supportable channels.

When a timeout occurs, the WFD R2 device activates the service seeker function as well to start active searching for partner devices on other channels. In addition, the WFD R2 device remains activating the service advertiser function and can be discovered by partner devices on the other channels. In addition, in a case where the WFD R2 device as a service seeker cannot discover any partner device in a second predetermined period of time, the device may deactivate the service seeker function.

The service advertiser function basically waits for receipt of a probe request frame, performs hash matching upon receipt of a probe request frame, and returns a probe response frame in a case where there is a match. Meanwhile, the service seeker function transmits a probe request frame by itself, which leads to increase in power consumption by the transmission power and requires the use of communication media at a transmission time. Therefore, upon occurrence of a timeout after the second predetermined period of time, the service seeker function is deactivated to lower power consumption of the device and save wireless communication media (avoid a traffic jam).

Figure 9:
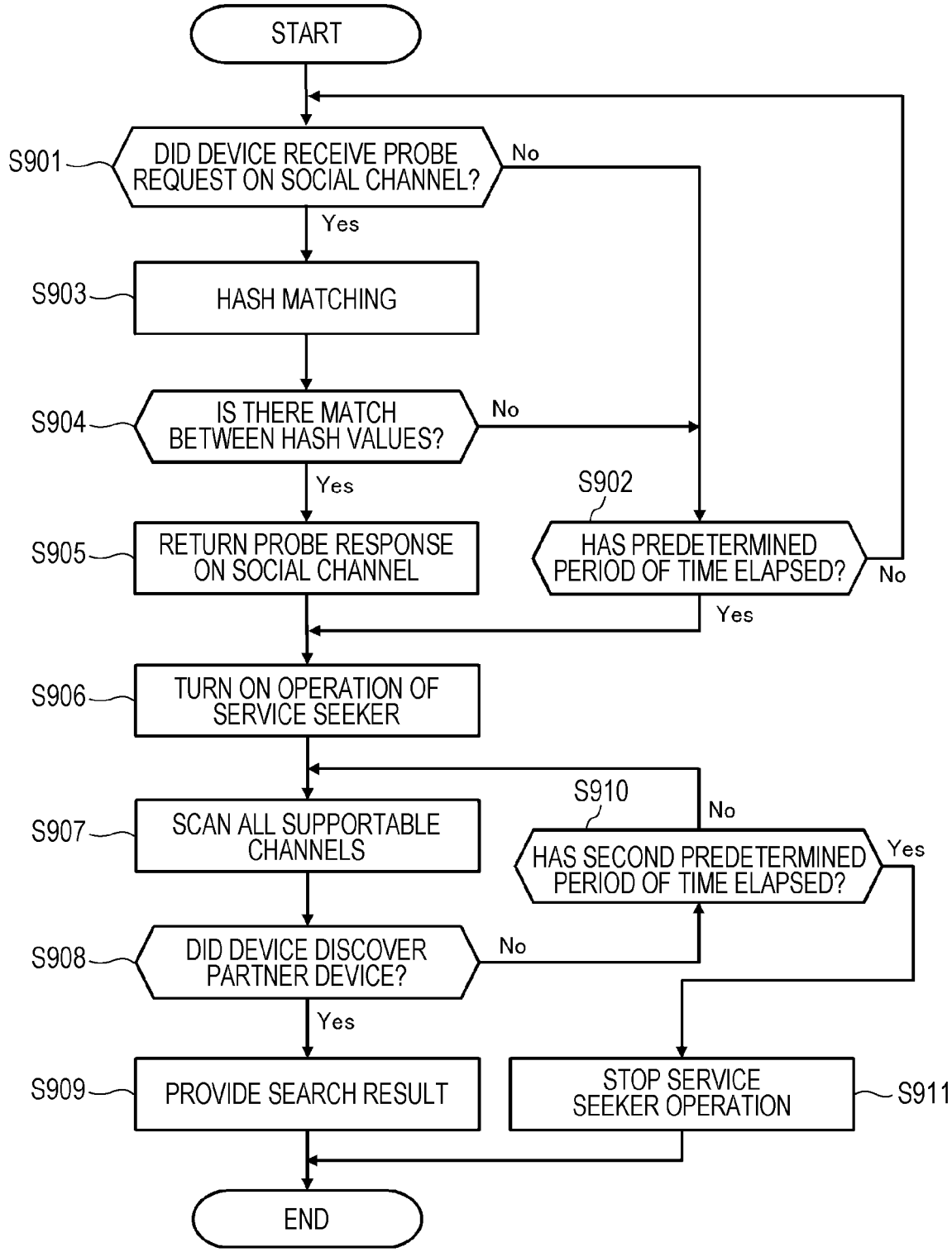
FIG. 9 is a flowchart of a procedure of operations for setting up a WFD R2 device activating only the service advertiser function on the P2P interface side in a situation without a limitation on usable channels to activate the service seeker function as well.

FIG. 9 is a flowchart of a procedure of operations for setting up a WFD R2 device activating only the service advertiser function on the P2P interface side in a situation without a limitation on usable channels to activate the service seeker function as well.

The WFD R2 device activating only the service advertiser function waits for receipt of a probe request frame on the social channel (step S901).

When the device can receive a probe request frame on the social channel (step S901: Yes) before occurrence of a timeout after a predetermined period of time (step S902: No), the device performs hash matching to determine whether a hash value included in the received probe request frame matches a service supported by the device itself (step S903).

Here, when there is a match between the hash values (step S904: Yes), the device can determine that the received probe request frame specifies a service supportable by the device itself. In this case, the device returns a probe response frame to the other device (step S905), and activates the service seeker function as well immediately (step S906).

Meanwhile, when the device cannot receive a probe request frame including a hash value matching a service supported by the device itself on the social channel within a predetermined period of time (step S904: No and step S902: Yes), the ASP in the device issues a seek service method to itself to allow the device to activate the service seeker function as well (step S906). Subsequently, the device starts operation of the service seeker function while continuing to operate as a service advertiser.

As a service seeker, the device performs scanning (that is, transmitting a probe request frame and waiting for reception of a probe response frame) on all the supportable channels (step S907). When a timeout occurs, the device activates the service seeker function as well to start active searching for partner devices on other channels. In addition, the device remains activating the service advertiser function and can be discovered by partner devices on the other channels.

The device performs repeatedly the scanning operation on all the channels only for the second predetermined period of time (step S910: No). In the meantime, the device remains activating the service advertiser function as well and can be discovered by partner devices on the other channels. For reference, in the processing procedure described in FIG. 9, the timeout mechanism for waiting for a predetermined period of time is used as a stop condition, but the use of any other stop condition, such as the maximum number of scanning attempts, would be similar in substance.

Then, when the device can receive a probe response frame on any of the channels and discover a desired partner device (step S908: Yes) within the second predetermined period of time (step S910: No), the device provides, as a search result, a UI of a list of partner devices discovered through the service layer and the application, to the user (step S909).

Meanwhile, in a case where the device cannot discover any partner device in the second predetermined period of time (step S910: Yes), that is, when a timeout occurs, the device deactivates the service seeker function (step S911).

There may be a modification example in which similar operations are performed on the BSS connection side. That is, the WFD R2 device activating only the service advertiser function for the BSS interface waits for receipt of an mDNS query including a hash value matching a service supported by itself for a predetermined period of time, and when receiving no mDNS query, the device activates the service seeker function to actively search for partner devices by transmitting an mDNS query including a character string corresponding to the service searched for by itself. In a case where the device still cannot discover any partner device in the second period of time, the device may deactivate the service seeker function. Deactivation of the service seeker function due to the timeout lowers power consumption of the device and saves wireless communication media (avoid a traffic jam).

(3-2) The WFD R2 device activating both the functions of service seeker and service advertiser for the P2P interface in a case without a limitation on usable channels transmits a probe request frame on the social channel and waits for receipt of a probe request frame from another device or receipt of a probe response frame to the probe request frame transmitted by the device itself for a predetermined period of time. Then, when the device cannot discover any partner device, the device performs scanning (that is, transmitting a probe request frame, waiting for receipt of a probe response frame, and waiting for receipt of a probe request frame) on all the supportable channels while activating both the service seeker function and the service advertiser function.

In this case, upon occurrence of a timeout, the WFD R2 device starts active search for partner devices on other channels. In addition, the WFD R2 device remains activating the service advertiser function and can be discovered by partner devices on the other channels. In addition, in a case where the WFD R2 device as a service seeker cannot discover any partner device in the second predetermined period of time, the device may deactivate the service seeker function.

Figure 10:
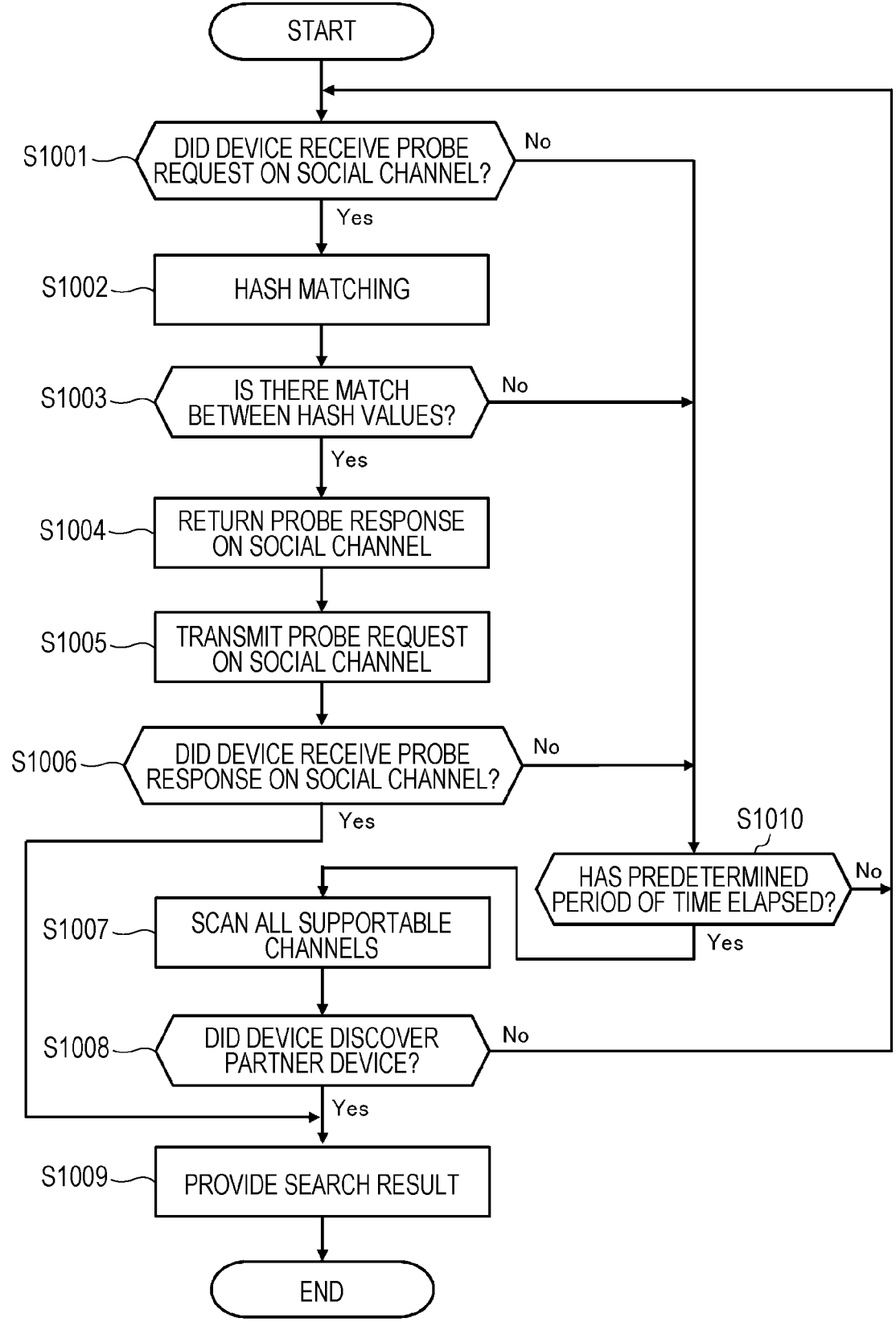
FIG. 10 is a flowchart of a procedure of operations for setting up a WFD R2 device activating both the functions of service seeker and service advertiser on the P2P interface side in a situation without a limitation on usable channels.

FIG. 10 is a flowchart of a procedure of operations for setting up a WFD R2 device activating both the functions of service seeker and service advertiser on the P2P interface side in a situation without a limitation on usable channels.

The WFD R2 device activating both the functions of service seeker and service advertiser waits for receipt of a probe request frame from another device on the social channel (step S1001).

When the device can receive any probe request frame on the social channel (step S1010: Yes) before occurrence of a timeout after a predetermined period of time (step S1010: No), the device performs hash matching to determine whether a hash value included in the received probe request frame matches a service supported by the device itself (step S1002).

Here, when there is a match between the hash values (step S1003: Yes), the device can determine that the received probe request frame specifies a service supportable by the device itself. In this case, the device returns a probe response frame to the other device (step S1004), and then continues to perform a service discovery process with partner devices. Specifically, the device transmits a probe request frame on the social channel (step S1005), and waits for receipt of a probe response frame to the probe request frame transmitted by the device itself (step S1006).

Meanwhile, if the device cannot receive a probe request frame or a probe response frame on the social channel within a predetermined period of time and cannot discover a partner device (step S1010: Yes), the device performs scanning (that is, transmitting a probe request frame) on all the supportable channels while activating both the service seeker function and the service advertiser function (step S1007). For reference, the device remains activating the service advertiser function and can be discovered by partner devices on other channels.

Then, when the device receives a probe response frame on the social channel (step S1006: Yes) or receives a probe response frame on any other channel and can discover a desired partner device (step S1008: Yes), the device provides a UI of a device list as a search result to the user through the service layer and the application (step S1009).

Meanwhile, in a case where the device cannot detect a partner device on any of the channels (step S1008: No), the device returns to step S1001 to repeatedly execute steps similar to the foregoing ones while activating both the functions of service seeker and service advertiser. Alternatively, in a case where the device cannot detect a partner device (step S1008: No), the device may provide a search result that no partner device could be discovered to the user through the service layer and the application, and then provide a UI for the user to select the continuance or discontinuance of an attempt to discover a partner device. Then, only in a case where the user selects the continuance, the device may return to step S1001, and in a case where the user does not select the continuance, the device may stop the search for a partner device. To stop the search for a partner device, the device preferably deactivates the service seeker function. For reference, in the processing procedure described in FIG. 10, the timeout mechanism for waiting for a predetermined period of time is used as a stop condition, but the use of any other stop condition, such as the maximum number of scanning attempts, would be similar in substance.

The common advantage of the points (3-1) and (3-2) is in that, in a case without a limitation on usable channels, the WFD R2 device can discover other devices operating on channels other than the social channel and incapable of shifting to another channel (WFD R2 devices and WFD R1 devices) and can be discovered by partner devices in reverse.

(3-3) In a case without a limitation on usable channels, the WFD R2 device activating both the functions of service seeker and service advertiser for the P2P interface transmits a probe request frame on the social channel and waits for receipt of a probe request frame from another device or receipt of a probe response frame to the probe request frame transmitted by the device itself for a predetermined period of time (as in the point (3-2)). Then, even if the device can discover a partner device, the device preferably performs scanning on all the supportable channels while activating both the service seeker function and the service advertiser function. This is intended to discover WFD R2 devices and WFD R1 device that might exist on other channels.

However, before starting scanning on all the supportable channels, the device may display a UI for the user to select permitting or wishing or not the scanning on channels other than the social channel.

Figure 11:
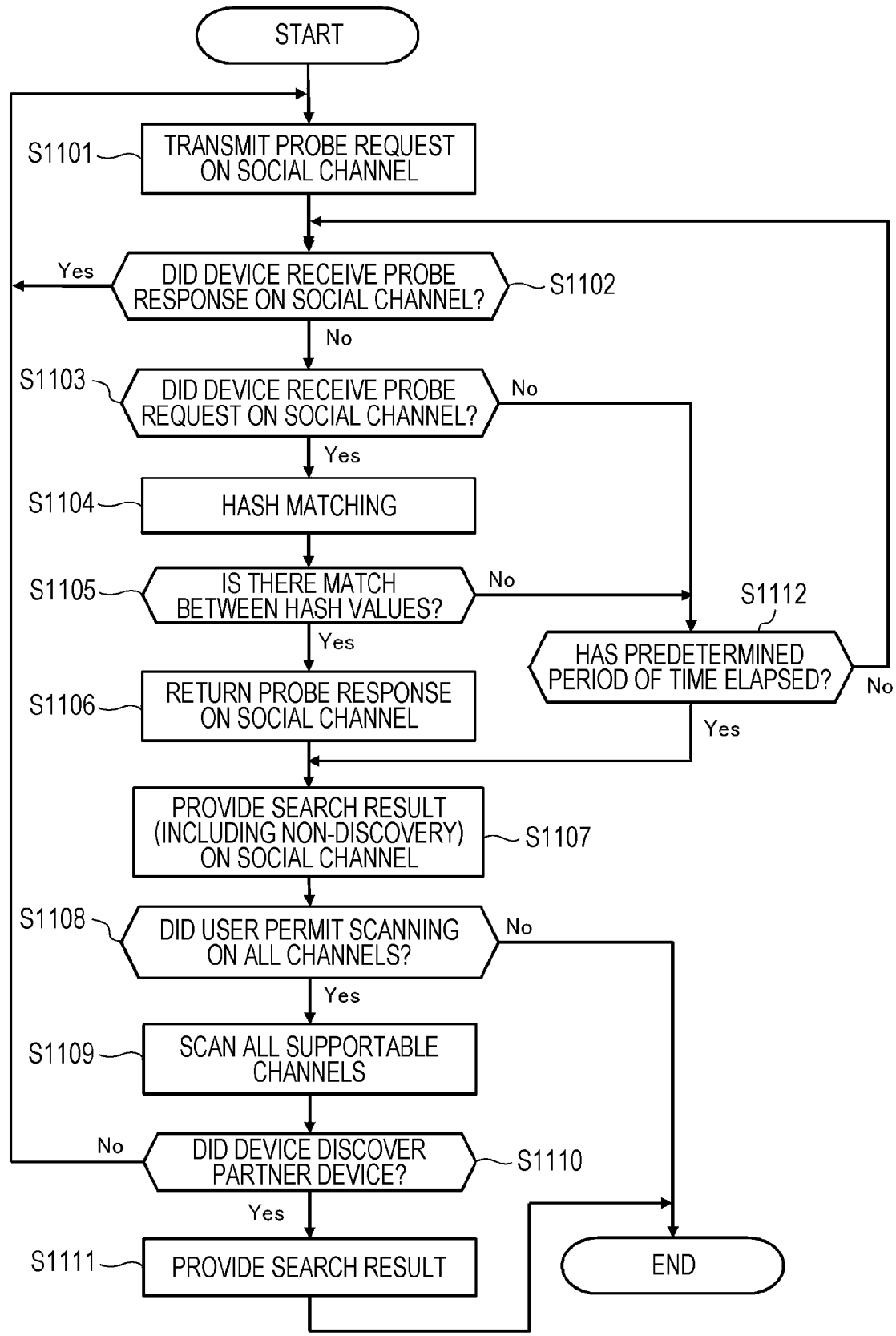
FIG. 11 is a flowchart of a procedure of operations for setting up a WFD R2 device activating both the functions of service seeker and service advertiser on the P2P interface side (however, scanning is surely performed on channels other than a social channel) in a situation without a limitation on usable channels.

FIG. 11 illustrates in flowchart form, a procedure of operations for setting up a WFD R2 device activating both the functions of service seeker and service advertiser on the P2P interface side (however, scanning is surely performed on channels other than the social channel) in a situation without a limitation on usable channels.

The WFD R2 device activating both the functions of service seeker and service advertiser transmits a probe request frame on the social channel (step S1101), waits for receipt of a probe response frame to the probe request frame transmitted by the device itself (step S1102), and waits for receipt of a probe request frame from another device (step S1103).

When the device can receive a probe request frame on the social channel (step S1103: Yes) before occurrence of a timeout after a predetermined period of time (step S1111: No), the device performs hash matching to determine whether a hash value included in the received probe request frame matches a service supported by the device itself (step S1104).

Here, when there is a match between the hash values (step S1105: Yes), the device can determine that the received probe request frame specifies a service supportable by the device itself. In this case, the device returns a probe response frame to the other device (step S1106).

After a lapse of a predetermined period of time, the device provides the result of search for partner devices on the social channel to the user in step S1107. At that time, in a case where the device cannot receive a probe request frame or a probe response frame or cannot discover a partner device on the social channel (step S1111: Yes), the device provides the search result that no partner device could be discovered on the social channel to the user. Meanwhile, in a case where the device receives a probe request frame on the social channel (step S1103: Yes), detects a match between the hash values (step S1105: Yes), and returns a probe response frame to the received probe request frame (step S1106), the device provides the search result that one or more devices could be discovered to the user. Further, in step S1107, the device displays a UI for the user to select permitting or wishing or not scanning on channels other than the social channel to check if to perform scanning on channels other than the social channel.

In a case of performing no scanning on channels other than the social channel (step S1108: No), the device deactivates the service seeker function and operates only the service advertiser function, and returns to the probe request frame waiting state. Alternatively, the device may return to step S1101 to repeatedly execute steps similar to the foregoing ones while activating both the functions of service seeker and service advertiser.

In a case of performing scanning on channels other than the social channel (step S1108: Yes), the device performs scanning (that is, transmitting a probe request frame, waiting for receipt of a probe request frame, and waiting for receipt of a probe request frame) on all the supportable channels while activating both the service seeker function and the service advertiser function (step S1109). For reference, the device remains activating the service advertiser function and can be discovered by partner devices on other channels.

Finally, when the device can receive a probe response frame on the social channel or any other channel and discover a desired partner device (step S1109: Yes), the device provides a UI of a device list as search result to the user through the service layer and the application (step S1110).

Meanwhile, in a case where the device cannot detect a partner device on any of the channels (step S1109: No), the device returns to step S1101 to repeatedly execute steps similar to the foregoing ones while activating both the functions of service seeker and service advertiser.

Alternatively, the device may deactivate the service seeker function and operate only the service advertiser function, and returns to the probe request frame waiting state. For reference, in the processing procedure described in FIG. 11, the timeout mechanism for waiting for a predetermined period of time is used as a stop condition, but the use of any other stop condition, such as the maximum number of scanning attempts, would be similar in substance.

(3-4) In a case where there is a restriction on usable frequencies, that is, the frame transmitting and receiving operations are limited to the operating channel, the WFD R2 device activating only the service advertiser function for the P2P interface waits for receipt of a probe request frame on the operating channel. The device activates the service seeker function as well immediately upon receipt of a probe request frame including a hash value matching a service supported by itself (for example, Miracast Sink). As a result, the device can transmit a probe request frame on the operating channel to discover partner devices by itself.

Figure 12:
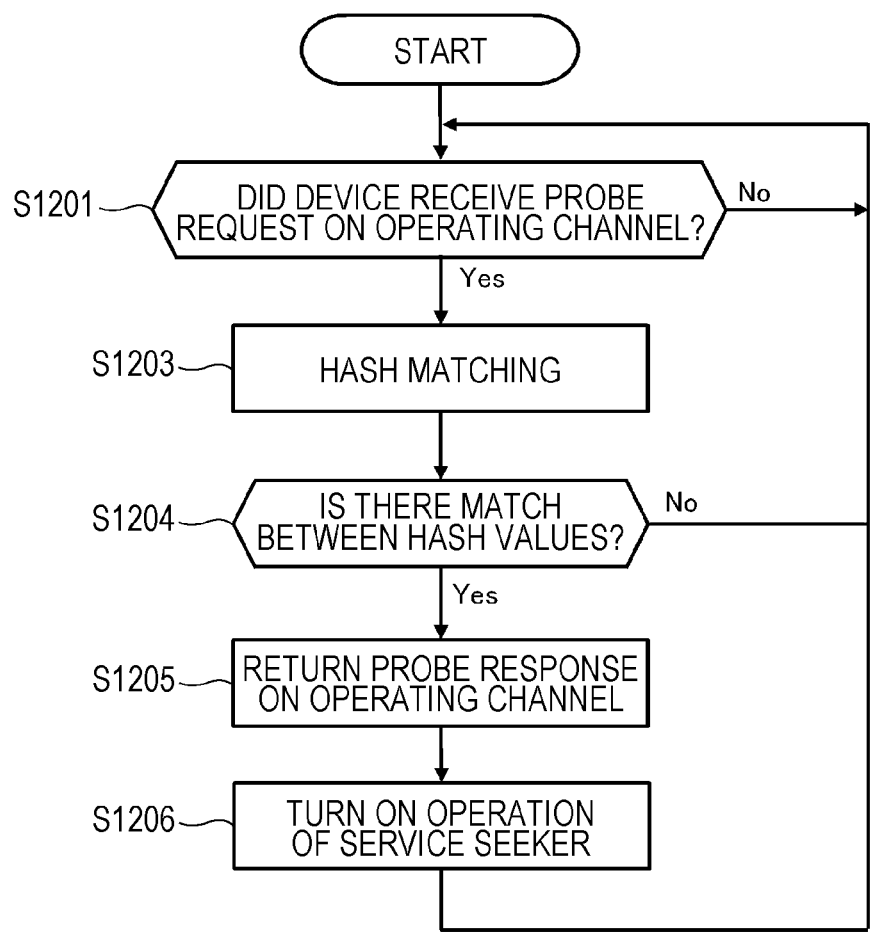
FIG. 12 is a flowchart of a procedure of operations for setting up a WFD R2 device activating only the service advertiser function on the P2P interface side in a situation with a limitation on usable channels to activate the service seeker function as well.

FIG. 12 illustrates in a flowchart form, a procedure of operations for setting up a WFD R2 device activating only the service advertiser function on the P2P interface side in a situation with a limitation on usable channels to activate the service seeker function as well.

The WFD R2 device activating only the service advertiser function waits for receipt of a probe request frame on the social channel (step S1201).

When receiving a probe request frame on the social channel (step S1201: Yes), the device performs hash matching to determine whether a hash value included in the received probe request frame matches a service supported by the device itself (step S1203).

When there is no match between the hash values (step S1204: No), the device returns to step S1201 to continue only the operation of the service advertiser function and wait for receipt of probe request frames from other devices.

Meanwhile, when there is a match between the hash values (step S1204: Yes), the device can determine that the received probe request frame specifies a service supportable by the device itself. In this case, the device returns a probe response frame (step S1205). Further, the ASP in the device issues a seek service method to itself to allow the device to activate the service seeker function as well (step S1206). Subsequently, the device starts the operation of the service seeker function as well while operating as a service advertiser on the operating channel.

(3-5) In a case where there is a restriction on usable frequencies, that is, the frame transmitting and receiving operations are limited to the operating channel, the WFD R2 device activating both the functions of service seeker and service advertiser for the P2P interface transmits a probe request frame on the operating channel and waits for receipt of a probe request frame from another device or waits for a probe response frame to the probe request frame transmitted by the device itself.

Figure 13:
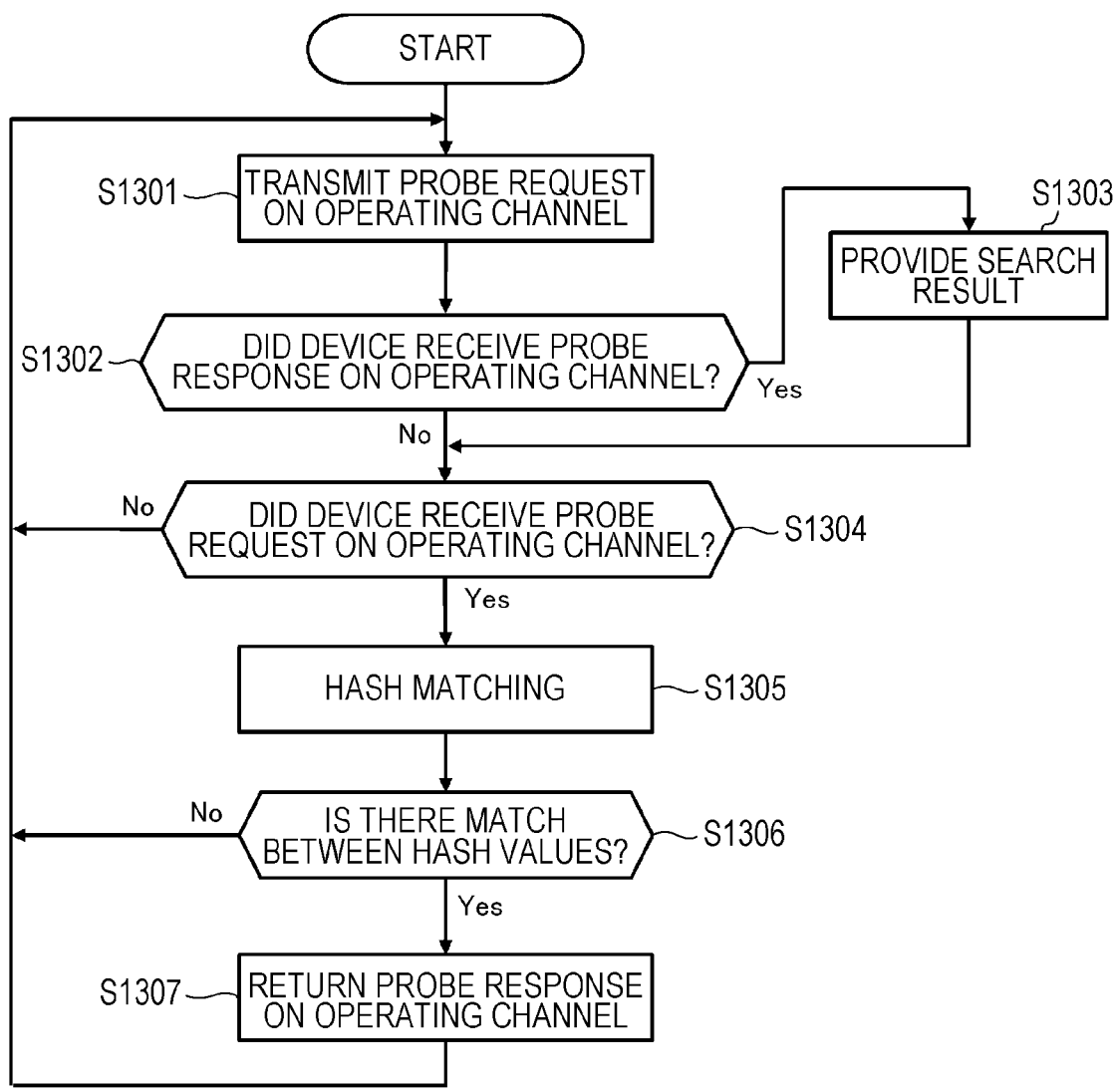
FIG. 13 is a flowchart of a procedure of operations for setting up a WFD R2 device activating both the functions of service seeker and service advertiser on the P2P interface side in a situation without a limitation on usable channels.

FIG. 13 illustrates in flowchart form, a procedure of operations for setting up a WFD R2 device activating both the functions of service seeker and service advertiser on the P2P interface side in a situation without a limitation on usable channels.

The WFD R2 device activating both the functions of service seeker and service advertiser first operates as a service seeker to transmit a probe request frame on the operating channel (step S1301).

When receiving a probe response frame to the probe request frame (step S1302: Yes), the device provides a UI of a device list as search result to the user through the service layer and the application (step S1303).

After the provision of the UI of the device list (step S1303), when receiving no probe response frame to the probe request frame (step S1302: No), the device then operates as a service advertiser to wait for receipt of a probe request frame from another device (step S1304).

When receiving no probe request frame (step S1304: No), the device returns to step S1301 to repeatedly transmit and receive a probe request frame or probe response frame on the operating channel while activating both the functions of service seeker and service advertiser.

Meanwhile, when receiving a probe request frame (step S1304: Yes), the device performs hash matching to determine whether a hash value included in the received probe request frame matches a service supported by the device itself (step S1305).

When there is no match between the hash values (step S1306: No), the device returns to step S1301 to repeatedly transmit and receive a probe request frame or probe response frame on the operating channel while activating both the functions of service seeker and service advertiser.

Meanwhile, when there is a match between the hash values (step S1306: Yes), the device can determine that the received probe request frame specifies a service supportable by the device itself. In this case, the device continues the operation of the service advertiser function. That is, the device returns a probe response frame to the other device (step S1307). After that, the device returns to step S1301 to repeatedly transmit and receive a probe request frame or probe response frame on the operating channel while activating both the functions of service seeker and service advertiser.

Meanwhile, FIG. 14 summarizes the main features of point (3).

According to the technology disclosed herein, in a case where a device operates as a service seeker and a service advertiser such that the device can discover other service devices compatible with the device itself and can be discovered by the other devices, it is possible to limit the time during which the device operates as a service seeker. This provides an advantage that the device can reduce power consumption and prevent wasteful use of wireless communication media by decreasing the frequency with which to transmit requests or queries specifying a supportable service, without lowering the probability that the device will discover other service-supporting devices or the probability that the device will be discovered by other service-supporting devices as compared to a case where the device always operates as a service seeker. Further, the device can activate the service seeker function in specific states to eliminate the possibility that the user might feel annoyed with the display of UIs of a partner device list and confirmation of connection at each discovery of a partner device.

INDUSTRIAL APPLICABILITY

The technology disclosed herein has been described in detail so far with reference to specific embodiments. However, it is self-evident that a person skilled in the art can achieve modifications and replacements of the embodiments without deviating from the substance of the technology disclosed herein.

The technology disclosed herein is favorably applicable to mainly communication apparatuses under the P2Ps specification, but is also similarly applicable to various other communication systems in which the roles of seeker and advertiser are defined in device discovery to make it easy to discover desired communication partners.

In short, the technology disclosed herein has been described so far in the form of exemplification, and the description herein should not be interpreted in a limited way. The claims should be considered to determine the substance of the technology disclosed herein.

For reference, the technology disclosed herein can be configured as described below.

(1) A communication apparatus supporting services using Wi-Fi P2P or BSS connection, in which, when one of a service advertiser function and a service seeker function is to be activated, the communication apparatus activates both the service advertiser function and the service seeker function.

(2) The communication apparatus according to (1), in which the communication apparatus activates the service seeker function with receipt of a seek service method from a service layer by an ASP in the communication apparatus as a trigger, and activates the service advertiser function as well when the service advertiser function is deactivated.

(3) A communication apparatus supporting services using Wi-Fi P2P or BSS connection, in which, when activating only a service advertiser function, the communication apparatus starts to activate a service seeker function with receipt of a request or a query specifying a supportable service as a trigger.

(4) The communication apparatus according to (3), in which, when activating only the service advertiser function, the communication apparatus activates the service seeker function to transmit a request or a query specifying a supportable service to another communication apparatus with receipt of a request including a hash value matching a name of a supportable service or a query including a character string indicating a name of a supportable service as a trigger.

(5) A communication apparatus supporting services using Wi-Fi P2P or BSS connection, in which, when activating only a service advertiser function in a situation without a limitation on usable channels, the communication apparatus starts to activate a service seeker function to transmit a request or a query specifying a supportable service on all supportable channels with no receipt of a request or a query specifying a supportable service on a social channel within a predetermined period of time as a trigger.

(6) The communication apparatus according to (5), in which the communication apparatus deactivates the service seeker function with no receipt of a response to the request or the query transmitted by using the service seeker function within a second predetermined period of time as a trigger.

(7) A communication apparatus supporting services using Wi-Fi P2P or BSS connection, in which, when activating both a service seeker function and a service advertiser function in a situation without a limitation on usable channels, the communication apparatus transmits a request or a query specifying a supportable service on all supportable channels with no receipt of a response to a request or a query specifying a supportable service transmitted by itself on a social channel within a predetermined period of time or with no receipt of a request or a query specifying a supportable service on the social channel within a predetermined period of time as a trigger.

(8) A communication apparatus supporting services using Wi-Fi P2P or BSS connection, in which, when activating both a service seeker function and a service advertiser function in a situation without a limitation on usable channels, the communication apparatus transmits by itself a request or a query specifying a supportable service and waits for receipt of a response to the request or the query transmitted by itself or receipt of a request or a query specifying a supportable service on a social channel, and then transmits a request or a query specifying a supportable service on all supportable channels.

(9) The communication apparatus according to claim 8, in which, after asking a user to confirm transmission of a request or a query on channels other than the social channel or after a lapse of a predetermined period of time, the communication apparatus transmits a request or a query on all the supportable channels.

(10) A communication apparatus supporting services using Wi-Fi P2P or BSS connection, in which, when activating only a service advertiser function in a situation where a usable channel is limited to an operating channel, the communication apparatus starts to activate a service seeker function to transmit a request or a query specifying a supportable service on the operating channel with receipt of a request or a query specifying a supportable service on the operating channel as a trigger.

(11) A communication apparatus supporting services using Wi-Fi P2P, in which, when activating both a service seeker function and a service advertiser function in a situation where a usable channel is limited to an operating channel, the communication apparatus transmits a probe request frame on the operating channel and waits for receipt of a probe request frame from another device or receipt of a probe response frame to the probe request frame transmitted by the device itself on the operating channel.

(12) A communication method of a communication apparatus supporting services using Wi-Fi P2P or BSS connection, including the steps of:
starting to activate a service seeker function; and
starting to activate a service advertiser function as well when the service advertiser function is deactivated.

(13) A communication method of a communication apparatus supporting services using Wi-Fi P2P or BSS connection, including the steps of:
activating a service advertiser function to wait for receipt of a request or a query specifying a supportable service from another communication apparatus; and starting to activate a service seeker function to transmit a request or a query specifying a supportable service with receipt of a request or a query specifying a supportable service as a trigger.

(14) A communication method of a communication apparatus supporting services using Wi-Fi P2P or BSS connection in a situation without a limitation on usable channels, including the steps of:
activating a service advertiser function to wait for receipt of a request or a query specifying a supportable service from another device on a social channel;
starting to activate a service seeker function with no receipt of a request or a query specifying a supportable service within a predetermined period of time as a trigger; and
transmitting a request or a query specifying a supportable service on all supportable channels.

(15) A communication method of a communication apparatus supporting services using Wi-Fi P2P or BSS connection in a situation without a limitation on usable channels, including the steps of:
activating both a service seeker function and a service advertiser function;
waiting for receipt of a response to a request or a query specifying a supportable service transmitted by itself on a social channel; and
transmitting a request or a query specifying a supportable service on all supportable channels with no receipt of a response to the request or the query transmitted by itself within a predetermined period of time or with no receipt of a request or a query specifying a supportable service within a predetermined period of time as a trigger.

(16) A communication method of a communication apparatus supporting services using Wi-Fi P2P or BSS connection in a situation without a limitation on usable channels, including the steps of:
activating both a service seeker function and a service advertiser function;
transmitting a request or a query specifying a supportable service on a social channel;
waiting for receipt of a response to the request or the query transmitted by itself or a request or a query specifying a supportable service; and
transmitting a request or a query specifying a supportable service on all supportable channels.

(17) A communication method of a communication apparatus supporting services using Wi-Fi P2P or BSS connection in a situation where a usable channel is limited to an operating channel, including the steps of:
activating a service advertiser function to wait for receipt of a request or a query specifying a supportable service from another device on the operating channel;
starting to activate a service seeker function with receipt of a request or a query specifying a supportable service on the operating channel as a trigger; and
transmitting a request or a query specifying a supportable service on the operating channel.

(18) A communication method of a communication apparatus supporting services using Wi-Fi P2P in a situation where a usable channel is limited to an operating channel, including the steps of:
activating both a service seeker function and a service advertiser function;
transmitting a probe request frame on the operating channel; and
waiting for receipt of a probe request frame from another device or receipt of a probe response frame to the probe request frame transmitted by the device itself on the operating channel.

REFERENCE SIGNS LIST

400 Communication apparatus
401 Data processing unit
402 Control unit
403 Communication unit
404 Power supply unit
411 Modulation and demodulation unit
412 Spatial signal processing unit
413 Channel estimation unit
414 Wireless interface unit
415 Amplifier unit
416 Antenna

The invention claimed is:
1. A communication apparatus supporting services using Wi-Fi basic service set (BSS) connection, the communication apparatus comprising:
circuitry configured to
when one of a service advertiser function and a service seeker function is to be activated in response to a receipt of a multicast domain name system (mDNS) query over the BSS connection including a character string corresponding to one of the services supported by the communication apparatus, the query being received through an access point (AP) and said one of the services being provided through the AP, activate both the service advertiser function and the service seeker function and, after occurrence of a stop condition, deactivate the service seeker function and continue to operate the service advertiser function, wherein the stop condition is a maximum number of scanning attempts; and in response to a determination that the mDNS query does not include the character string, not activate both the service advertiser function and the service seeker function.

2. The communication apparatus according to claim 1, wherein the circuitry is configured to activate the service seeker function with receipt of a seek service method from a service layer by an application service platform (ASP) in the communication apparatus as a trigger, and to activate the service advertiser function as well when the service advertiser function is deactivated.

3. A communication method of a communication apparatus supporting services using Wi-Fi basic service set (BSS) connection, comprising the steps of:

starting to activate a service seeker function;

in response to a receipt of a multicast domain name system (mDNS) query over the BSS connection including a character string corresponding to one of the services supported by the communication apparatus, the query being received through an access point (AP) and said one of the services being provided through the AP, starting to activate a service advertiser function as well and, after occurrence of a stop condition, deactivating the service seeker function and continuing to operate the service advertiser function, wherein the stop condition is a maximum number of scanning attempts; and in response to a determination that the mDNS query does not include the character string, not activating both the service advertiser function and the service seeker function.

* * * * *